(12) United States Patent
Frenne et al.

(10) Patent No.: US 9,055,566 B2
(45) Date of Patent: *Jun. 9, 2015

(54) METHOD IN A WIRELESS COMMUNICATION SYSTEM

(71) Applicant: HUAWEI TECHNOLOGIES CO., LTD., Shenzhen (CN)

(72) Inventors: Mattias Frenne, Uppsala (SE); Jianghua Liu, Beijing (CN); Branislav Popovic, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,422

(22) Filed: Nov. 20, 2013

(65) Prior Publication Data

US 2014/0080497 A1    Mar. 20, 2014

Related U.S. Application Data

(63) Continuation of application No. 13/272,913, filed on Oct. 13, 2011, now Pat. No. 8,634,844, which is a continuation of application No. 13/081,294, filed on Apr. 6, 2011, now abandoned, which is a continuation of application No. PCT/CN2008/072940, filed on Nov. 4, 2008.

(51) Int. Cl.
*H04W 72/00* (2009.01)
*H04W 72/04* (2009.01)
(Continued)

(52) U.S. Cl.
CPC ............... *H04W 72/04* (2013.01); *H04L 1/06* (2013.01); *H04L 1/1607* (2013.01);
(Continued)

(58) Field of Classification Search
CPC ..... H04W 72/00; H04W 72/04; H04W 16/10; H04W 28/16; H04W 16/14
USPC .................... 455/450, 451, 452.1, 452.2, 453
See application file for complete search history.

(56) References Cited

U.S. PATENT DOCUMENTS 7,957,759 B2   6/2011  Papasakellariou
8,046,029 B2   10/2011 Teo et al.
(Continued)

FOREIGN PATENT DOCUMENTS

CN       1996806 A     7/2007
EP       2180732 A1    4/2010
(Continued)

OTHER PUBLICATIONS

Chinese Patent No. 102100015, issued on Jun. 20, 2012, granted in corresponding Chinese Patent Application No. 200880131330.7, 1 page.

(Continued)

*Primary Examiner* — Temica M Beamer
(74) *Attorney, Agent, or Firm* — Brinks Gilson & Lione

(57) ABSTRACT

A method in a Central Node (CN), a method in a Remote Node (RN), and a method in a wireless communication system for allocating reference signals to be used for uplink transmission are disclosed. According to one aspect reference signals are allocated with a method comprising the steps of: determining in a CN a number of reference signals N to be used for uplink transmission by a Remote Node RN; indicating to the RN the number of reference signals N to be used for uplink transmission by the RN; configuring an uplink transmission by the RN with at most the number of reference signals N; and performing by the RN the uplink transmission with at most the number of reference signals N on transmit antennas comprised in the RN. The present disclosure further discloses a CN and a RN relating to the methods.

12 Claims, 4 Drawing Sheets

(51) Int. Cl.
  *H04L 1/18*  (2006.01)
  *H04L 5/00*  (2006.01)
  *H04L 1/06*  (2006.01)
  *H04L 1/16*  (2006.01)
  *H04L 25/02*  (2006.01)

(52) U.S. Cl.
  CPC ........... *H04L 1/1861* (2013.01); *H04L 5/0051* (2013.01); *H04L 5/0091* (2013.01); *H04L 25/0226* (2013.01); *H04L 5/0048* (2013.01)

(56) References Cited

U.S. PATENT DOCUMENTS

| | | |
|---|---|---|
| 2007/0253465 A1 | 11/2007 | Muharemovic et al. |
| 2008/0013610 A1 | 1/2008 | Varadarajan et al. |
| 2008/0045260 A1 | 2/2008 | Muharemovic et al. |
| 2009/0092086 A1 | 4/2009 | Lee et al. |
| 2009/0278742 A1 | 11/2009 | Mehta et al. |

FOREIGN PATENT DOCUMENTS

| | | |
|---|---|---|
| WO | WO 2007/117127 A1 | 10/2007 |
| WO | WO 2007/127902 A2 | 11/2007 |
| WO | WO 2007/133411 A2 | 11/2007 |
| WO | WO 2008/041940 A2 | 4/2008 |
| WO | WO 2010/008180 A2 | 1/2010 |

OTHER PUBLICATIONS

Mitsubishi Electric, "UL Sounding RS Control Signaling for Closed Loop Antenna Selection" Agenda Item 6.1.2, 3GPP RAN1#52, Sorrento, Italy. Feb. 11-15, 2008, 8 pages.

3GPP, $3^{rd}$ Generation Partnership Project; Technical Specification Group Radio Access Network; Evolved Universal Terrestrial Radio Access (E-UTRA); Physical Layer Procedures (Release 8) 3GPP TS 36.213. V8.4.0, Sep. 2008, 60 pages.

3GPP, 3rd Generation Partnership Project; Technical Specification Group Radio Access Network; Evolved Universal Terrestrial Radio Access (E-UTRA); Physical Channels and Modulation (Release 8) 3GPP TS 36.211. v8.4.0, Sep. 2008, 78 pages.

(11) Determining in a CN a number of reference signals $N$ to be used for uplink transmission by a RN.

(12) Indicating to the RN the number of reference signals $N$ to be used for uplink transmission by the RN.

(13) Configuring an uplink transmission by the RN with the number of reference signals $N$.

(14) Performing by the RN the uplink transmission with the number of reference signals $N$ on transmit antennas comprised in the RN.

Figure 5

(21) Determining a number of reference signals N to be used by a RN for an uplink transmission.

(22) Indicating to the RN the number of reference signals N.

Figure 6

(31) Receiving an indication of a number of reference signals N to be used for uplink transmission by a RN.

(32) Configuring an uplink transmission with the number of reference signals N.

(33) Performing the uplink transmission with the number of reference signals N on transmit antennas comprised in the RN.

Figure 7

METHOD IN A WIRELESS COMMUNICATION SYSTEM

CROSS-REFERENCE TO RELATED APPLICATION

This application is a continuation of U.S. application Ser. No. 13/272,913, filed on Oct. 13, 2011, which is a continuation of U.S. application Ser. No. 13/081,294, filed on Apr. 6, 2011, which is a continuation of International Application No. PCT/CN2008/072940, filed on Nov. 4, 2008. All of the applications listed above are hereby incorporated by reference in their entireties.

TECHNICAL FIELD

The present disclosure relates to a method in a central node, a method in a remote node, and a method in a wireless communication system for allocating reference signals to be used for uplink transmission. Furthermore, a central node and a remote node relating to the methods above are disclosed.

BACKGROUND

A Mobile Station (MS) may have multiple physical antennas and for each physical antenna there is an associated transmit power amplifier. From each physical antenna a Sounding Reference Signal (SRS) is transmitted with the purpose of enabling measurements at a receiving Base Station (BS). SRSs from different antennas may be code, frequency or time multiplexed, and furthermore SRSs must be multiplexed between all users in a cell. The SRS resources are allocated to different MS in a semi-static fashion by higher layer signalling from a BS to a MS.

Furthermore, to enable coherent demodulation of transmitted signals at a receiving BS Demodulation Reference Signals (DRSs) are used. These reference signals define different antenna ports and are code multiplexed between antenna ports and users. Mapping of antenna ports to physical antennas is a method known in the art and an example of such mapping is shown in FIG. 1. The size of a common set of available reference signals is restricted by the number of antenna ports.

The number of available SRSs is much larger than the number of available DRSs since SRSs are multiplexed in time and frequencies as well as in code dimensions, whereas DRSs are multiplexed in code dimensions.

An uplink cellular wireless communication system with multiple users is considered. To estimate channels from each user to a receiver, and to be able to perform coherent demodulation of transmitted information from the users DRSs are transmitted, wherein the DRS from each antenna and each user are orthogonal to each other. It may be noted that another term for DRSs is pilot signals for demodulation.

Furthermore, assume that the size of a set of available orthogonal reference signals (such as DRSs) is finite and limited. It means that the number of simultaneously multiplexed users will be upper limited by the size of the set of orthogonal reference signals and the upper limit is obtained if all users use a single orthogonal reference signal. Further, with the introduction of multiple physical antennas at the user terminals, it is possible to use transmit diversity or spatial multiplexing to enhance the capacity or coverage of the system at the expense of an increased number of used reference signals per user.

Transmit diversity will give an increased Signal-to-Noise Ratio (SNR) at a receiver. The increased SNR will extend the coverage of a transmitter-receiver link or makes it possible to use a more aggressive code rate and/or modulation scheme so that a larger number of information bits can be transmitted. This is denoted link adaptation and will increase the capacity of the link. Sometimes link adaptation is not utilized for a certain channel, but instead a fixed modulation and code rate is selected based on the SNR for a worst case user terminal. The use of transmit diversity for this channel is therefore unnecessary for the terminals which already have a medium to high received SNR. Transmit diversity will in this case only marginally improve the detection performance. An example of a fixed modulation and code rate is transmission of ACK/NACK in a 3GPP LTE system, which is not adapted to the link quality, but merely designed for a worst possible encountered SNR. If a MS close to a BS (with low path loss) transmits an ACK/NACK message, the BS will experience a high SNR without the use of transmit diversity, and will correctly decode the ACK/NACK message with very high probability. The extra gain in SNR provided by transmit diversity is therefore unnecessary for this particular user. If transmit diversity over multiple antenna ports is used in this case, it will only result in consumption of orthogonal reference signals from the set of orthogonal reference signals but the benefit is very small or even none existing.

Spatial multiplexing increases the spectral efficiency by transmitting independent data streams from each antenna. If channels from the antennas are correlated, the decoding of the data streams will have poor performance and the advantage of multiple stream spatial multiplexing is thereby limited. The reason is that the correlated channel does not have the 'richness' to support multiple streams. Hence, the use of multiple antennas, wherein each antenna would use a DRS from the common set of DRSs is unnecessary and will not provide higher spectral efficiency.

If the number of allocated DRSs for a user is high, as discussed in the two cases above, then the common set of DRSs will be consumed quickly and as a consequence, the maximal number of multiplexed users will be low. FIG. 2 shows an example of how DRSs may be allocated for four MSs with two antennas each.

According to prior art a method is proposed where a receiver measures signals transmitted from a transmitter with multiple antenna ports, and feeds back a channel quality indicator to the transmitter containing at least a preferred transmission mode. The transmission mode consists of a transmission rank and a precoding matrix index, where the rank is the number of parallel spatial streams to be transmitted. The transmitter then subsequently provides an adaptation of the transmission mode based on the reported channel quality indicator. The adaptation of the transmission mode is made using a precoding matrix, modulation-coding scheme and the rank. The number of antenna ports (or equivalently the number of reference signals) in this method is constant and the number of parallel transmitted streams is adapted using a rank feedback and a precoder matrix.

In another solution according to the prior art, a downlink transmission scheme is proposed where a Common Reference Signal (CRS) is transmitted from each antenna port. Hence, there is no set of reference signals that needs to be shared between users in the system. Therefore, the same CRS are utilized by all users. For downlink transmit diversity in this prior art solution all antenna ports are always used and the transmit diversity method that matches the number of antenna ports is selected. For downlink spatial multiplexing in this case, the CRSs are used to calculate the rank which determines the number of multiplexed spatial layers of transmission the downlink channel can support. The user terminal then explicitly signals to a BS its desired rank. For example, if the rank is measured to be one then a precoding vector will be used to map the single data stream to the multiple antenna ports. The user will use the CRS for all antenna ports and the knowledge of the precoding vector to demodulate the transmitted signal.

Hence, there is a need in the art for efficient use of reference signals in the uplink of a wireless communication system.

SUMMARY

In one aspect, a number of reference signals assigned to each remote node at a particular moment in a system can be adjusted and adapted. Since there is a limited number of reference signals, the present disclosure provides the advantage that more remote nodes can simultaneously be multiplexed, thereby increasing the uplink capacity of the system. Another advantage of an embodiment of the disclosure is that since the number of reference signals allocated to each remote node is reduced, which implies that the power share given to each reference signal increases, and hence results in improved channel estimation performance. Furthermore, since the number of reference signals used by a remote node can be dynamically adjusted, the present disclosure provides the advantage that the number of used reference signals is sufficient for satisfactory operation of the remote unit.

Other advantages will become apparent from the following detailed description of preferred embodiments of the present disclosure.

BRIEF DESCRIPTION OF THE DRAWINGS

The appended drawings are intended to clarify and explain the present disclosure where:

FIG. 5 shows a flowchart of a method for allocating reference signals in a wireless communication system according to an embodiment of the present disclosure;

FIG. 6 shows a flowchart of a method in a central node for allocating reference signals according to the embodiment of the present disclosure; and FIG. 7 shows a flowchart of a method in a remote node according to the embodiment of the present disclosure.

DETAILED DESCRIPTION

Figure 3:
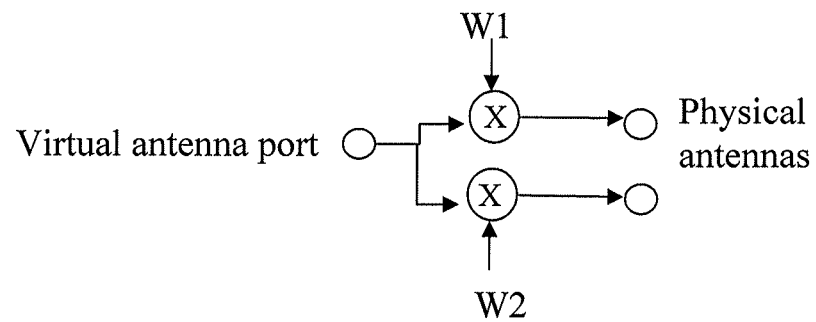
FIG. 3 shows an example of a virtual antenna port mapped to two physical antennas using complex valued weights.

A user terminal may have multiple physical antennas. If the same signal is simultaneously transmitted from the multiple physical antennas then these multiple antennas can jointly be seen logically/electrically as one large virtual antenna composed of the multiple physical antennas. From the receiver perspective, the physical antennas are transparent, meaning that they cannot be individually distinguished. If each physical antenna is multiplied with a complex valued constant, then the concept of virtual antenna still holds. In this case, a virtual antenna is obtained by a linear mapping from a virtual antenna port or equivalently virtual antenna input to physical antennas. Whatever is transmitted from the virtual antenna will undergo a defined mapping and be transmitted from the physical antennas. FIG. 3 shows an example of a virtual antenna port mapped to two physical antennas.

Mapping is described in general by the connection from virtual antenna ports to physical antennas and weighted by complex valued weights e.g. W1 and W2 as shown in FIG. 3, which may be constant, semi-static or adaptively varying. The mapping may also be a function of frequency as in an OFDM system where it depends on the subcarrier index number. Furthermore, the mapping may additionally be a function of time.

Figure 4:
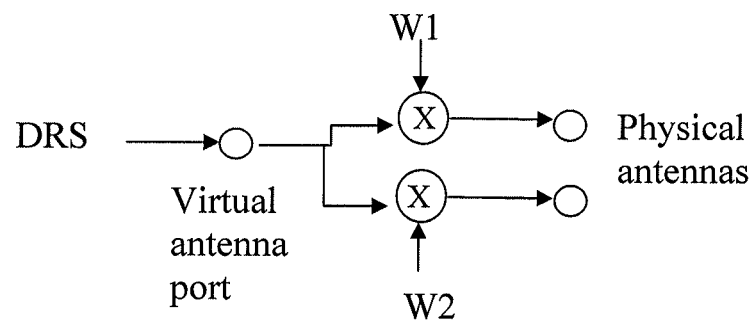
FIG. 4 shows insertion of DRSs before mapping.

If a DRS is transmitted through a virtual antenna, as shown in the example in FIG. 4, the DRS in this example will be copied into two replicas, each weighted by complex valued weights W1 and W2, respectively, and then transmitted from each of the two physical antennas shown in FIG. 4. A receiver will use the DRS to estimate the channel between the transmitter and receiver. It should be noted that the mapping and the values of the weights W1 and W2 in the example in FIG. 4 will not be visible to the receiver, but will instead be part of, and indistinguishable from the channel. In this way, the receiver will see the two antenna transmitters as an equivalent single transmit antenna (i.e. a virtual antenna) since it will estimate the single channel between the virtual antenna port and the receive antenna by using the DRS. Hence, with this arrangement the receiver becomes agnostic to the number of physical antennas used.

The concept of a single virtual antenna can be extended to multiple virtual antennas and each virtual antenna is then associated with a unique DRS. The use of virtual antennas instead of physical antennas as the point where DRSs are inserted has several benefits.

Firstly, since the amount of available power that may be used for DRS transmission is limited, therefore it is better if as few DRSs as possible is used, since each DRS will get a larger share of the total available power. Secondly, in some systems, such as for uplink ACK/NACK transmissions in 3GPP Long Term Evolution (LTE) and 3GPP LTE Advanced systems, the total number of DRSs that can be used in one slot and in one Resource Block (RB) is limited and must be shared by all users in a cell that transmits ACK/NACK signals simultaneously in the slot and RB. If each user has multiple physical antennas, and each antenna uses one DRS, the number of simultaneously multiplexed users transmitting ACK/NACK signals will be severely limited. Introducing virtual antennas and adapting the number of virtual antennas to each user enable a larger number of multiplexed users and/or a larger number of transmitted ACK/NACK signals per user; hence an increase in the uplink ACK/NACK capacity may be achieved with the concept of virtual antenna.

A MS with a plurality of physical transmit antennas has capability to use transmit diversity, where an information symbol is transmitted over more than one of the plurality of transmit antennas. Since the channels from each transmit antenna to receiving antennas, at e.g. a BS, experience different fading, diversity is obtained. There exists a plethora of different transmit diversity techniques among which space-time coding (often implemented using codes with so called Alamouti-structure), antenna switched diversity, precoding vector switched diversity or cyclic delay diversity are just some examples. Transmit diversity will make the transmission more resistant to fading, thereby improving the effective SNR at the receiver, which in turn will improve the reliability of the transmission and extend the range from a BS for which the MSs may operate.

The concept of virtual antennas, as described above, may also be applied to different transmit diversity schemes. If e.g. two virtual antennas are selected, then transmit diversity schemes designed for two antennas must be used. In this way, by using virtual antennas, it is possible to use two antenna transmit diversity schemes even for user terminals with four antennas. The benefit with this solution would be that two DRSs are required, which could improve the channel estimation performance compared to the case where four DRSs are used together with a four-antenna transmit diversity scheme. Furthermore, the number of used DRSs would be reduced.

Multiple transmit antennas can also be used in spatial multiplexing schemes. An example is the case when each antenna transmits one information symbol each. If M number of antennas is employed then M symbols can be multiplexed and the capacity is increased M times. The M multiplexed symbols are often denoted as M streams or M layers. It is the task of the receiver to detect each of the M transmitted symbols. If the fading channels from each transmit antenna to the receive antennas are correlated the detection process of the M information symbols becomes less successful. If the channel conditions are such that this correlated fading occurs, spatial multiplexing should be avoided and instead fewer than M number of streams should be transmitted, or if the correlation is high even a single stream transmission should take place. The transmission of fewer streams than M can be achieved by the above mentioned method according to prior art, where a precoding matrix is used and the rank of the precoding matrix is selected to be less than M. In this prior art solution, one DRS per physical antenna is required. According to the present disclosure, transmission of fewer streams than M is obtained by defining a number of virtual antennas to be equal to the number of streams. Each virtual antenna will use one DRS, and thereby DRS resources is saved with respect to the method in prior art which always use M number of DRS resources irrespectively of the number of streams/rank.

A general idea according the present disclosure is that the number of virtual antennas per user, and hence the number of DRSs per user is controlled by a Central Node (CN), e.g. a BS such as an eNB in the 3GPP LTE system or a Node B in the UMTS system. Thereby, the number of used DRSs per user terminal can be kept to a minimum compared to the case where each user is allocated one DRS per physical antenna. The present disclosure thus allows the CN to adaptively adjust the number of DRSs used per user, based on each users need. The adaptation is dynamic and the number of DRSs may change frequently, based on various information, such as, but not limited to, uplink channel measurements such as SNR or signal to interference plus noise ratio, downlink load as the number of transport blocks, number of Hybrid Automatic Request (HARQ) processes, or number of code words or uplink load as number of simultaneous ACK/NACKs.

If a user has R number of physical transmit antennas or if R virtual antennas are used, then a R:th order transmit diversity can be used to improve the reliability of the transmission, especially for users with poor channel conditions or with low SNR values. In the opposite case, where the channel condition is very good, for instance at high SNR values, it is unnecessary to use transmit diversity (or at least high order transmit diversity), since the transmitted signal will be received correctly with a very high probability without high order transmit diversity. Users experiencing these conditions can use fewer virtual antennas or even a single virtual antenna, or equivalently, fewer DRSs or a single DRS and transmit its uplink information over this reduced set of virtual antenna(s). In this way, the DRS resources may be saved.

An adaptation of the number of used DRSs as described is very important for DRS-limited systems where the number of DRSs is a scarce resource such as for the uplink ACK/NACK transmission in a 3GPP LTE type system.

When a MS knows how many DRSs, or equivalently how many virtual antennas it may use, the MS (transmitter) arrange the mapping between each defined virtual antenna port and the physical antennas. Examples of this mapping are, but not limited to, antenna selection in where each virtual antenna port is mapped to one of the physical antennas or cyclic delay diversity mapping where each virtual antenna port is mapped to all physical antennas but with a phase shift different for each physical antenna. The phase shift may for instance depend on frequency/OFDM subcarrier, time, virtual antenna port number or physical antenna number.

FIG. 5 shows a flowchart of a method for allocating reference signals in a wireless communication according to the embodiment of the present disclosure. The wireless communication system comprises at least one CN and at least one Remote Node (RN) in its most rudimentary form, but usually includes at least a plurality of RNs, Furthermore, each RN comprises at least one physical transmit antenna, but may have e.g. two, four or eight transmit antennas. Further, a RN may be a MS such as a User Equipment (UE), but can also be a relay station for relaying information signals in a wireless communication system from e.g. a BS to a UE. The system may further comprise both MSs and relay stations.

The method for allocating reference signals in a wireless communication system according to the present disclosure comprises: (11) determining in a CN a number of reference signals N to be used for uplink transmission by a RN; (12) indicating to the RN the number of reference signals N to be used for uplink transmission by the RN; (13) configuring an uplink transmission by the RN with at most the number of reference signals N; and (14) performing by the RN the uplink transmission with at most the number of reference signals N on transmit antennas comprised in the RN. For the case with a plurality of RNs the method above is repeated for all RNs in the cell.

A method according to the embodiment of the present disclosure in a CN is shown in a flowchart in FIG. 6 and comprises: (21) determining a number of reference signals N to be used by a RN for an uplink transmission; and (22) indicating to the RN the number of reference signals N.

Furthermore, a method according to the embodiment of the present disclosure in a RN is shown in a flowchart in FIG. 7, and comprises: (31) receiving an indication of a number of reference signals N to be used for uplink transmission by a RN; (32) configuring an uplink transmission with at most the number of reference signals N; and (33) performing the uplink transmission with at most the number of reference signals N on transmit antennas comprised in the RN.

A CN may determine a number of reference signals N based on many different factors and different kinds of information.

In an embodiment of the present disclosure the number of reference signals N is based on the cell load in a cellular system. For instance, if the cell load is low and there is no practical limitation in the number of DRSs available, then a high value for N may be selected. If the cell load is very high, a CN may need to be more economical in allocating the available DRSs, in this case the CN can choose to select a larger number of antenna ports N for those users which really would benefit from a large number of antenna ports such as for low SNR users or relay stations (RN). In addition to using SRS to measure the channel, the CN can also decide the number of allocated antenna ports for a certain RN based on the downlink traffic load for this particular RN. For instance, in downlink transmissions there are several Transport Blocks (TB) transmitted simultaneously to a given RN. Therefore, the RN must feedback several ACK/NACKs to the CN in response to the downlink transmission. Hence, the CN can allocate several virtual antennas (corresponding to several DRS) for this particular RN for transmission of an ACK/NACK per virtual antenna.

Figure 1:
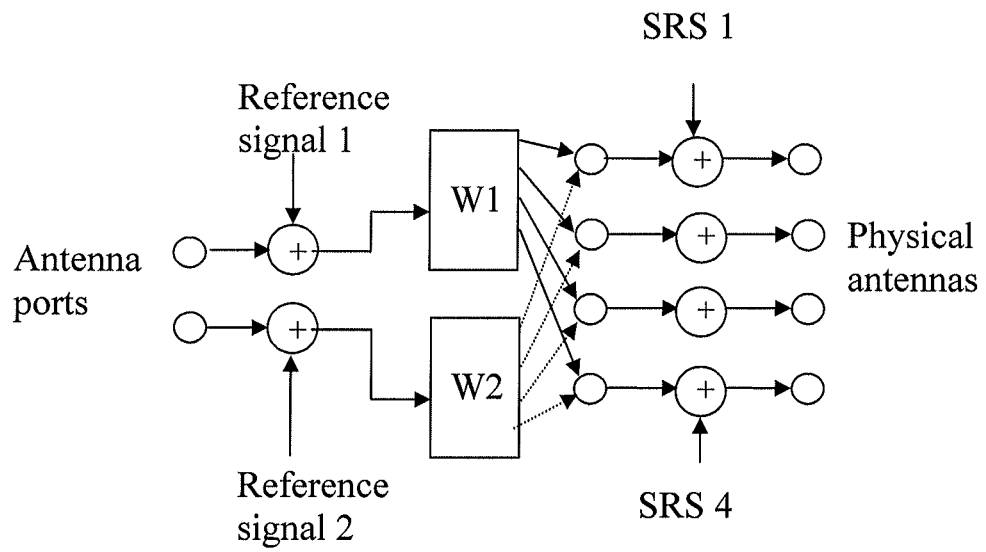
FIG. 1 shows an example of two antenna ports mapped to four physical antennas.
Figure 2:
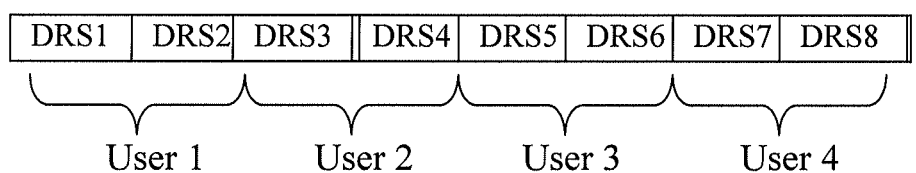
FIG. 2 shows an example of allocation of DRSs to different MSs each with two antennas.

In another embodiment of the disclosure N is determined based on uplink measurements, wherein a CN determines how many number of reference signals N (antenna ports) a user requires for satisfactory operation by uplink measurements. For instance, the CN can measure the channel from each physical transmit antenna using the SRS which is transmitted from the physical antennas (in the example in FIG. 1 it is shown how the SRSs are transmitted differently from how the DRSs are transmitted). The SRSs are transmitted periodically and are not related to any data transmission from a RN. It means that the SRSs are not suitable for demodulation of data, but for occasional measurements of the channel. The CN can also use SRSs to measure a SNR for a given RN and provide the RN information upon which the RN can decide the transmission mode (e.g. transmit diversity or spatial multiplexing), and the number of required virtual antennas for the RN. As an example, if a SNR is measured and found to be very high for a particular RN the CN may select N=1 for the RN and signal the value of N in a downlink signalling.

Furthermore, according to the present disclosure indication of a number of reference signals N from a CN to a RN may be either explicit or implicit.

In an embodiment with explicit indicating, a value N representing a number of reference signals to be used by a RN is present in a control channel transmission from a CN to a RN. In 3GPP LTE the control channel that may carry such information is the Physical Downlink Control Channel (PDCCH), but can also be performed on the Radio Resource Control (RRC) channel. Further, the value N can also be semi-statically configured, in which case the value may be signalled by a higher level message (which is signalled much more infrequently than the PDCCH).

In another embodiment of the present disclosure the indicating is implicit, hence is performed by implicit signalling of a number of reference signals N. The value N can for instance be determined from an attribute of a downlink signalling at the receiver. An example is given for the 3GPP LTE system, where the size of a PDCCH implicitly can be used to indicate the value N. The PDCCH in the LTE system consists of 1, 2, 4 or 8 Control Channel Elements (CCE). A straightforward implicit indication (signalling) of N is where a value $N_{Max}$ is received which equals to the size (measured in number of CCEs) of a received PDCCH for a RN, and defines the maximum number of reference signals to be used. It should be noted in this case that the value N is not explicit present in the information content of the PDCCH, but merely is given implicit by the size of the PDCCH. With implicit signalling reduced overhead in downlink transmissions can be achieved.

Furthermore, since $N_{Max}$ in this example can be 1, 2, 4 or 8 then the value of $N_{Max}$ may exceed the maximum allowed value set by the system. For instance, an RN may have four physical antennas and it would in this case be useful to limit the number of virtual antennas to an upper limit value $N_{Lim}$, which is known to both the CN and RN, and therefore corresponds to the number of physical antennas for a particular RN. In this case, a simple algorithm or rule could be agreed between a CN and a RN such that e.g.:

If $N_{Max} > N_{Lim}$, then $N = N_{Lim}$ number of DRSs should be allocated to the RN, otherwise $N_{Max}$ number of DRSs should be allocated (and if $N_{Max} = N_{Lim}$, $N_{Max}$ or $N_{Lim}$ number of DRS should be allocated), and where the value $N_{Lim}$ can be semi-statically configured by using higher layer signalling or be explicitly signalled in e.g. PDCCH or RRC channel. Therefore, in this example in addition to implicit signalling of the value N through the use of the attribute of $N_{Max}$, an explicit signalling (indicating) of the value $N_{Lim}$ may be performed.

An example of an implementation of allocation of reference signals according to the present disclosure in a wireless communication system with implicit indicating is described below.

A CN monitors SNR values for a plurality of RNs in a cellular wireless communication system, such as e.g. 3GPP LTE. The SNRs values are monitored by performing measurements in a cell on the transmitted SRSs for the plurality of RN, wherein each RN in this particular example is assumed to be equipped with two physical transmit antennas. A subset of the plurality of the RN in the cell is scheduled in a subframe, and the scheduling information is transmitted to each scheduled RN in the downlink PDCCH, in the preamble of the subframe. For RNs with low SNR the CN wants to enable transmit diversity for those RNs, and therefore allocates PDCCH with at least two CCEs for those RNs. For RNs with high SNR the CN allocates PDCCHs with a single CCE. Since the CN knows how many CCEs that are consumed by all the downlink PDCCHs the CN has control over the DRS resources for the subsequent ACK/NACK transmissions from the RNs. The CN can not use more CCEs in the downlink PDCCH transmission than there are DRSs available for the uplink ACK/NACK transmission, which is 36 per resource block in the 3GPP LTE system.

Each RN reads their PDCCH and registers the size of the PDCCH measured in the number of CCEs. Those RNs that have received a PDCCH with a single CCE will use a single antenna port (corresponding to one reference signal) for the ACK/NACK transmission, and further on those RNs that have received a PDCCH with 2, 4 or 8 CCEs will use two antenna ports for its uplink ACK/NACK transmission since the RNs in this example are assumed to have two physical antennas, and hence the maximum number of antenna ports is therefore two (minimum of $N_{Max}$ and $N_{Lim}$). Certainly, if the RN includes more physical antennas than two, in this example, the RN may use the signalled value if possible.

The RNs decode their downlink data messages and prepare the uplink ACK/NACK transmissions in response to the downlink transmission. The ACK/NACKs are signalled in the uplink a predetermined period of T subframes from the downlink PDCCH transmission. The value T is known to all RNs in the cell so those RNs that receive the PDCCH in the same subframe will also transmit their respective ACK/NACKs in the same uplink subframe a period of T subframes later.

If a RN has a single virtual antenna port but two physical antennas the RN can map an ACK/NACK to both physical antennas using some mapping function. An example is using fixed weighting functions [W1 W2]=[1 1]. A single DRS will also be transmitted together with the ACK/NACK information. The dual antenna port RNs will use two different virtual antenna to physical antenna mappings, and from each virtual antenna port transmit a unique DRS. For instance the weighting functions for virtual antenna one may be [W1 W2]=[1 1] and for virtual antenna two be [W1 W2]=[1 −1]. The ACK/NACK will then be transmitted using both virtual antennas based on some transmit diversity scheme. The CN will estimate the channels from each virtual antenna of the RN by using the DRSs. After the channel has been estimated the ACK/NACK signal can be detected. Since the CN knows the number of DRS allocated for each RN from the size of the downlink PDCCH assignments, the CN can coherently detect the ACK/NACK signals from the RN. This process is then repeated for all RNs in the system.

As understood by a person skilled in the art, the method in a CN and in a RN as described above may be implemented in a CN and in a RN to be used in a wireless communication system. The CN and RN may further be configured in accordance with the different embodiments of the methods according to the dependent claims 2-16 and 8-31, respectively Furthermore, as also understood by the person skilled in the art, the operations performed by the CN and RN, described above, may be implemented in a computer program, having instruction code, which when run in a computer causes the computer to perform the operations. The computer program is included in a non-transitory computer readable storage medium of a computer program product. For example, the computer readable storage medium may correspond to any memory, such as a ROM (Read-Only Memory), a PROM (Programmable Read-Only Memory), an EPROM (Erasable PROM), a Flash memory, an EEPROM (Electrically Erasable PROM), a hard disk drive, a different type of storage medium, and any combination of the same.

While various embodiments have been described, it will be apparent to those of ordinary skill in the art that many more embodiments and implementations are possible that are within the scope of the claims. Therefore, the embodiments described are only provided as an aid in understanding the claims and are not intended to limit the scope of the claims.

The invention claimed is:

1. A remote node in a wireless communication system comprising:
   at least one transmit antenna for uplink transmission comprising; and
   at least one processor configured to:
      receive an indication of a number of reference signals to be used for uplink transmission;
      configure an uplink transmission with the number of reference signals; and
      perform the uplink transmission with the number of reference signals on the at least one transmit antenna,
      wherein the reference signals comprise demodulation reference signals (DRSes) orthogonal to each other.

2. The remote node according to claim 1, wherein the remote node receives the indication of the number of reference signals to be used for uplink transmission by the remote node through radio resource control (RRC) signalling.

3. The remote node according to claim 1, wherein the wireless communication system is a 3GPP long term evolution advanced (LTE-A) system.

4. The remote node according to claim 1, wherein a set of the DRSes is finite.

5. An apparatus in a remote node in a wireless communication system, the apparatus comprising:
   at least one transmit antenna for uplink transmission and;
   at least one processor configured to:
      receive an indication of a number of reference signals to be used for uplink transmission;
      configure an uplink transmission with the number of reference signals; and
      perform the uplink transmission with the number of reference signals on the at least one transmit antenna,
      wherein the reference signals comprise demodulation reference signals (DRSes) orthogonal to each other.

6. The apparatus according to claim 5, further configured to receive the indication of the number of reference signals to be used for uplink transmission by the remote node through radio resource control (RRC) signalling.

7. The apparatus according to claim 5, wherein the wireless communication system is a 3GPP long term evolution advanced (LTE-A) system.

8. The apparatus according to claim 5, wherein a set of the DRSes is finite.

9. A non-transitory computer-readable storage medium having stored thereon a computer program comprising at least one code section for operating a remote node in a wireless communication system, the at least one code section being executable by a machine for causing the machine to perform acts of:
   receiving an indication of a number of reference signals to be used for uplink transmission;
   configuring an uplink transmission with the number of reference signals; and
   performing the uplink transmission with the number of reference signals on the at least one transmit antenna,
   wherein the reference signals comprise demodulation reference signals (DRSes) orthogonal to each other.

10. The non-transitory computer-readable storage medium according to claim 9, wherein the indicating is performed through radio resource control (RRC) signalling.

11. The non-transitory computer-readable storage medium according to claim 9, wherein the wireless communication system comprises a 3GPP long term evolution advanced (LTE-A) system.

12. The non-transitory computer-readable storage medium according to claim 9, wherein the set of the DRSes is finite.

* * * * *